United States Patent
Nakano et al.

(10) Patent No.: US 9,961,300 B2
(45) Date of Patent: May 1, 2018

(54) CONVERSATION COMMUNICATION SYSTEM AND CONVERSATION COMMUNICATION METHOD

(71) Applicant: Daiwa House Industry Co., Ltd., Osaka (JP)

(72) Inventors: Tsukasa Nakano, Osaka (JP); Takashi Orime, Osaka (JP)

(73) Assignee: Daiwa House Industry Co., Ltd., Osaka (JP)

(*) Notice: Subject to any disclaimer, the term of this patent is extended or adjusted under 35 U.S.C. 154(b) by 0 days. days.

(21) Appl. No.: 15/511,834

(22) PCT Filed: Sep. 17, 2015

(86) PCT No.: PCT/JP2015/076530
§ 371 (c)(1),
(2) Date: Mar. 16, 2017

(87) PCT Pub. No.: WO2016/043279
PCT Pub. Date: Mar. 24, 2016

(65) Prior Publication Data
US 2017/0310928 A1    Oct. 26, 2017

(30) Foreign Application Priority Data
Sep. 18, 2014   (JP) ................. 2014-190250

(51) Int. Cl.
*H04N 7/14*  (2006.01)
*H04L 29/06*  (2006.01)
*G06K 9/00*  (2006.01)
*G06T 7/70*  (2017.01)

(52) U.S. Cl.
CPC ......... *H04N 7/147* (2013.01); *G06K 9/00228* (2013.01); *G06T 7/70* (2017.01); *H04L 65/1059* (2013.01)

(58) Field of Classification Search
USPC ................. 348/14.01, 14.08, 14.16
See application file for complete search history.

(56) References Cited

U.S. PATENT DOCUMENTS

| | | | |
|---|---|---|---|
| 9,282,127 B1* | 3/2016 | Burns | H04L 65/1089 |
| 2011/0196745 A1* | 8/2011 | Moriya | G06Q 30/02 |
| | | | 705/14.67 |
| 2015/0237079 A1 | 8/2015 | Hirata | |

FOREIGN PATENT DOCUMENTS

| | | |
|---|---|---|
| JP | 2006140747 A | 6/2006 |
| JP | 2010183205 A | 8/2010 |
| JP | 2014090230 A | 5/2014 |

* cited by examiner

*Primary Examiner* — Quoc D Tran
(74) *Attorney, Agent, or Firm* — Young Basile Hanlon & MacFarlane, P.C.

(57) ABSTRACT

In a conversation communication system, a facial image of the communicator is stored, a distance between the communicator and a display and the direction of the face of the communicator are detected. It is determined whether or not the conversation communication is to be continued according to the detected distance and the detected facial direction. When the detected facial direction is a direction facing the display from the front, the conversation communication is to be continued. On the other hand, in a case where the detected facial direction is different, when the detected distance increases afterward, if any of the following conditions (1) and (2) is satisfied, the conversation communication is terminated: (1) the distance is undetectable; and (2) the detected facial direction is, for equal to or longer than a preset period of time, maintained at the direction different from the direction facing the display from the front.

5 Claims, 8 Drawing Sheets

STATE WHEN CONVERSATION IS HELD

NORMAL STATE

CONVERSATION COMMUNICATION SYSTEM AND CONVERSATION COMMUNICATION METHOD

CROSS REFERENCE TO RELATED APPLICATION

This application claims priority to Japanese Patent Application No. 2014-190250, filed on Sep. 18, 2014, and is herein incorporated by reference in its entirety.

TECHNICAL FIELD

The present invention relates to a conversation communication system and a conversation communication method, and relates to conversation communication system and method capable of terminating conversation communication in proper procedure.

BACKGROUND

A communication technique allowing persons respectively in a plurality of distant spaces to have conversation while viewing their video images each other has been already known. Such conversation communication is implemented in such a manner that communication units provided respectively in the plurality of distant spaces communicate with each other.

In order to terminate the above-described conversation communication, one of the communicators takes action (hereinafter referred to as "termination action") such that a predetermined termination condition is satisfied. In a typical conversation communication system, output of words or a gesture as a sign for termination of conversation is employed as the termination action (see, e.g., JP 2014-090230 and JP 2010-183205). As an example, in communication systems described in Patent Literatures 1 and 2, output of words such as "good bye" or a gesture such as handwaving from one of communicators is detected as a sign for termination of conversation. Then, conversation communication is interrupted with detection of action, i.e., the sign for termination of conversation, as a trigger.

In the case of using words or a gesture as the sign for termination of conversation as in JP 2014-090230 and JP 2010-183205 described above, many words and gestures as described above need to be assumed and be registered in advance in order to accept various communicators and conversation situations (e.g., a spoken language and a gesture vary according to a communicator's attribute and a relationship between communicators). However, in fact, it is extremely difficult to assume all situations and register words and gestures in advance. On the other hand, when the communicator involuntarily outputs the words or the gesture registered as the sign for termination of conversation, the conversation communication is interrupted against the intention of wishing to continue conversation.

Alternatively, it may be configured such that a human sensor is provided in a space (a room) where the communicator is present while having conversation and that a condition where the human sensor no longer detects a person in the space is taken as the conversation termination condition. Note that in this configuration, a person still remaining in the space after the communicator has moved to the outside of the space is erroneously detected by the human sensor. In such a case, the conversation communication is continued although conversation has ended.

As another alternative, it may be configured such that a voice detection sensor is provided in the space (the room) where the communicator is present while having conversation and that a condition where the voice detection sensor no longer detects voice in the space is taken as the conversation termination condition. Note that in this configuration, noise caused in the space after the communicator has moved to the outside of the space is, as in the above-described configuration, erroneously detected by the voice detection sensor. As a result, the conversation communication is continued although conversation has ended.

SUMMARY

The present invention has been made in view of the above-described problems, and is intended to provide conversation communication system and method capable of terminating, at timing suitable for a communicator, conversation communication executed for conversation between persons respectively in distant spaces.

Moreover, the present invention is also intended to prevent a situation where, e.g., a person still remaining in a space where the communicator is present and noise caused in such a space is recognized after the communicator has ended conversation, and therefore, conversation communication is erroneously continued.

The above-described problems are solved by a conversation communication system of the present invention. The conversation communication system of the present invention is a conversation communication system for implementing conversation between communicators respectively in a plurality of spaces which are distant from each other by communication units provided respectively in the plurality of distant spaces to communicate with each other. Each of the communication units includes a storage configured to store a facial image of the communicator in one of the plurality of spaces, a distance detector configured to detect a distance between the communicator whose facial image has been stored in the storage and a reference position set in the one of the plurality of spaces, a direction detector configured to detect the facial or sight line direction of the communicator whose facial image has been stored in the storage, and a determiner configured to determine, according to the distance detected by the distance detector and the direction detected by the direction detector, whether or not communication between the communication units is to be continued. While the direction detected by the direction detector is a predetermined direction relative to equipment placed at the reference position, the determiner determines that the communication between the communication units is to be continued. When the distance detected by the distance detector increases after the direction detected by the direction detector has changed to a direction different from the predetermined direction relative to the equipment, if any of conditions (1) and (2) is satisfied, the determiner determines that the communication between the communication units is to be terminated, the condition (1) being that the communicator whose facial image has been stored in the storage is at such a position that the distance is undetectable by the distance detector and the condition (2) being that the direction detected by the direction detector is, for equal to or longer than a preset period of time, maintained at the direction different from the predetermined direction relative to the equipment.

In the above-described configuration, when the direction of the face or the line of sight of the communicator is the predetermined direction relative to the equipment, the conversation communication is continued. On the other hand, when the direction of the face or the line of sight of the communicator is the direction different from the predetermined direction relative to the equipment, if the distance between the communicator and the reference position increases afterward (i.e., when the communicator moves apart from the reference position), the conversation communication is terminated upon satisfaction of any of the conditions (1) and (2).

That is, in the conversation communication system of the present invention, the direction of the face or the line of sight of the communicator and the position of the communicator (precisely, the position relative to the reference position) are used as parameters in determination of termination of the conversation communication. With this configuration, a failure caused when termination of the conversation communication is determined based only on one of the parameters, such as a situation where the conversation communication is terminated due to an instantaneous change in the face or the line of sight, can be avoided. Moreover, it is not necessary to register many words and gestures as a sign for termination of conversation, assuming any conversation situations.

With the above-described feature, the conversation communication can be, according to the conversation communication system of the present invention, properly terminated when the conversation communication needs to be terminated by the communicator.

Moreover, in the above-described conversation communication system, each of the communication units preferably further includes a register configured to register the communicator, the storage preferably stores the facial image of the communicator registered by the register, and the register preferably registers a person in the one of the plurality of spaces as the communicator, the person whose facial or sight line direction detected by the direction detector being the predetermined direction relative to the equipment.

In the above-described configuration, the facial image of the communicator is registered for conversation. Specifically, the person whose facial or sight line direction relative to the equipment disposed at the reference position is the predetermined direction is registered as the communicator. Then, using the facial or sight line direction of the person registered as the communicator and the position of such a person as parameters, the determiner determines the necessity for termination of the conversation communication. With this configuration, a situation can be avoided, in which, e.g., a person still remaining in a space where the communicator is present and noise caused in such a space is recognized after termination of conversation, and therefore, the conversation communication is erroneously continued.

Further, in the above-described conversation communication system, the register more preferably registers one of persons satisfying a condition (3) as the communicator, the persons whose facial or sight line directions detected by the direction detector being the predetermined direction relative to the equipment in the one of the plurality of spaces and the condition (3) being that the distance to the reference position as detected by the distance detector does not increase during a period until a predetermined period of time is elapsed after the facial or sight line direction detected by the direction detector has changed to the predetermined direction relative to the equipment.

In the above-described configuration, the condition where the communicator does not move farther from the reference position until the predetermined period of time is elapsed after the facial or sight line direction has changed to the predetermined direction is used as a registration condition, and the person satisfying such a condition is registered as the communicator. With this configuration, erroneous registration of the communicator can be prevented, and only the person who truly needs to be registered as the communicator can be registered as the communicator.

In addition, in the above-described conversation communication system, each of the communication units much more preferably includes, as the equipment, a display forming a display screen configured to display a video image of the communicator of the other space, the reference position is much more preferably a placement position of the display in the one of the plurality of spaces, and the predetermined direction is much more preferably a direction facing the display screen from a front thereof.

In the above-described configuration, the condition where the facial or sight line direction is the direction facing the display screen of the display from the front thereof is taken as the registration condition. The action of facing the display screen from the front thereof is an expression of the intention of having conversation. Thus, the above-described contents are employed as the registration condition, and in this manner, erroneous registration of a person who should not be registered as the communicator (i.e., the person whose is present around the display although not having the intention of having conversation) can be effectively prevented.

Moreover, in the above-described conversation communication system, the distance detector much more preferably includes a sensor placed in the one of the plurality of spaces and configured to output a signal corresponding to the distance when the communicator is in the one of the plurality of spaces, and the position at which the distance is undetectable by the distance detector is much more preferably outside an area where the communicator is detectable by the sensor.

In the above-described configuration, the condition where the communicator moves to the outside of the detection area of the sensor is taken as one of the conditions for termination of the conversation communication. The action of moving to the outside of the detection area of the sensor is an expression of the intention of moving apart from a conversation location, i.e., terminating conversation. Thus, the above-described contents are employed as the conversation termination condition so that the conversation communication can be terminated at timing at which it is reasonable to terminate the conversation communication according to the communicator's intention.

The above-described problems are solved by a conversation communication method of the present invention. The conversation communication method of the present invention is a conversation communication method for implementing conversation between communicators respectively in a plurality of spaces which are distant from each other by communication units provided respectively in the plurality of spaces to communicate with each other. The method includes storing, by a storage included in each of the communication units, a facial image of the communicator in a corresponding one of the plurality of spaces; detecting, by a distance detector included in each of the communication units, a distance between the communicator whose facial image has been stored in the storage and a reference position set in the corresponding one of the plurality of spaces; detecting, by a direction detector included in the each of the communication units, the direction of the face or the line of sight of the communicator whose facial image has been stored in the storage; and determining, by a determiner included in the each of the communication units, whether or not communication between the communication units is to be continued according to the distance detected by the distance detector and the direction detected by the direction detector. While the direction detected by the direction detector is a predetermined direction relative to equipment placed at the reference position, the determiner determines that the communication between the communication units is to be continued. When the distance detected by the distance detector increases after the direction detected by the direction detector has changed to a direction different from the predetermined direction relative to the equipment, if any of conditions (1) and (2) is satisfied, the determiner determines that the communication between the communication units is to be terminated, the condition (1) being that the communicator whose facial image has been stored in the storage is at such a position that the distance is undetectable by the distance detector and the condition (2) being that the direction detected by the direction detector is, for equal to or longer than a preset period of time, maintained at the direction different from the predetermined direction relative to the equipment.

According to the above-described method, the direction of the face or the line of sight of the communicator and the position of the communicator (precisely, the position relative to the reference position) are used as parameters in determination of termination of the conversation communication. With this configuration, the conversation communication can be terminated at more proper timing as compared to a case where termination of the conversation communication is determined using only one of the above-described parameters.

According to the conversation communication system and method of the present invention, the direction of the face or the line of sight of the communicator and the position of the communicator (precisely, the position relative to the reference position) are used as parameters in determination of termination of the conversation communication. With this configuration, the failure caused when termination of the conversation communication is determined based only on one of the parameters, such as a situation where the conversation communication is terminated due to an instantaneous change in the face or the line of sight or slight movement during conversation, can be avoided. Moreover, it is not necessary to register many words and gestures as a sign for termination of conversation, assuming any communicators and any conversation situations. Thus, the conversation communication can be terminated at proper timing regardless of communicators and conversation situations.

Further, the communicator is registered for conversation. Then, based on the facial or sight line direction of the person registered as the communicator and the position of such a person, the necessity for termination of the conversation communication is determined. With this configuration, a situation can be avoided, in which, e.g., a person still remaining in a space where the communicator is present and noise caused in such a space is recognized after termination of conversation, and therefore, the conversation communication is erroneously continued.

DETAILED DESCRIPTION OF THE EMBODIMENTS

An embodiment (hereinafter referred to as a "present embodiment") of the present invention will be described below with reference to drawings.

A conversation communication system (hereinafter referred to as a "present system S") of the present embodiment is for implementing conversation between communicators in a plurality of distant spaces. More specifically, the present system S is utilized so that the communicator in each space can have conversation while the communicators are looking at each other (viewing their images each other). Note that the present system S is used so that one communicator can have conversation with a communication partner at one's own home. Note that the present invention is not limited to such a configuration, and the present system S may be used for conversation with a person at other locations (e.g., a meeting place and a commercial facility) than a home. Alternatively, the present system S may be used for conversation between persons in distant rooms at the same building.

For the sake of easy understanding of the configuration of the present system S, a case where two communicators utilize the present system S to have conversation will be described below as an example. In this case, one of the communicators is a person A, and the other communicator is a person B. Note that the number of persons who can simultaneously have conversation with each other via the present system S is not limited to two, and may be three or more.

Figure 1:
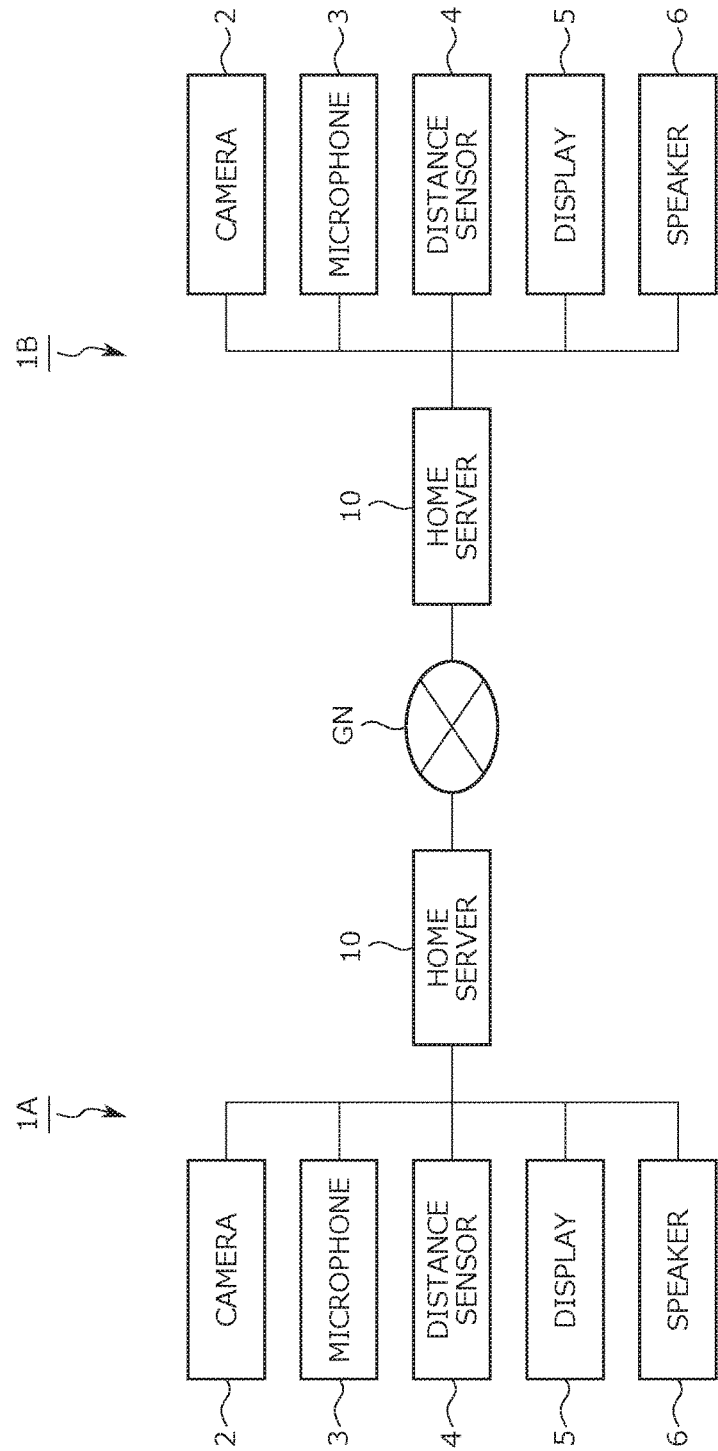
FIG. 1 is a diagram of a configuration of a conversation communication system of an embodiment of the present invention.

As illustrated in FIG. 1, the present system S includes communication units 1A, 1B owned respectively by the persons A, B. FIG. 1 is a diagram of the configuration of the present system S. The communication units 1A, 1B are placed respectively at homes of the communicators (i.e., the persons A, B). Communication between the communication units 1A, 1B, i.e., data communication (hereinafter referred to as "conversation communication") for conversation, is performed so that the persons A, B can have conversation (dialogue) while looking at each other at their own homes.

The configurations of the communication units 1A, 1B will be described below. Note that the communication unit 1A of the person A and the communication unit 1B of the person B have similar configurations, and therefore, only the configuration of the communication unit 1A of the person A will be described below.

<<Configuration of Communication Unit>>

The communication unit 1A includes a camera 2 as an imaging device, a microphone 3 as a sound collection device, a display 5 as a video image display device, speakers 6 as voice reproduction devices, and a home server 10 as a communication device. The home servers 10 are communicatably connected together via an external communication network GN such as the Internet. Data indicating a video image and voice of the person A is transmitted to the person B via communication between the home servers 10. Similarly, data indicating a video image and voice of the person B is transmitted to the person A via communication between the home servers 10.

Figure 2B:
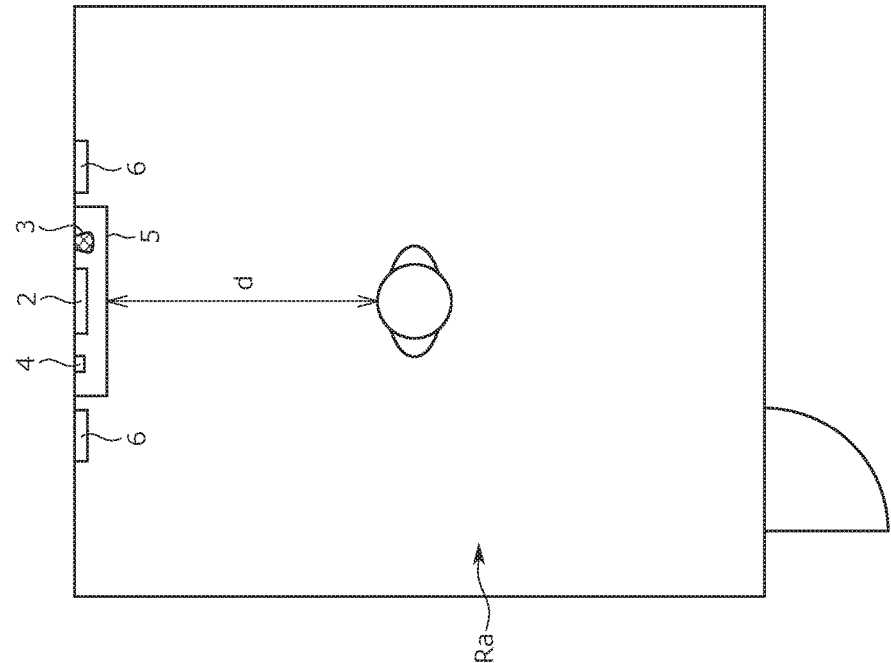
FIGS. 2(A) and 2(B) are views of arrangement of components of a communication unit in a space where a communicator is present, and illustrate a front view and a plan view, respectively.
Figure 2A:
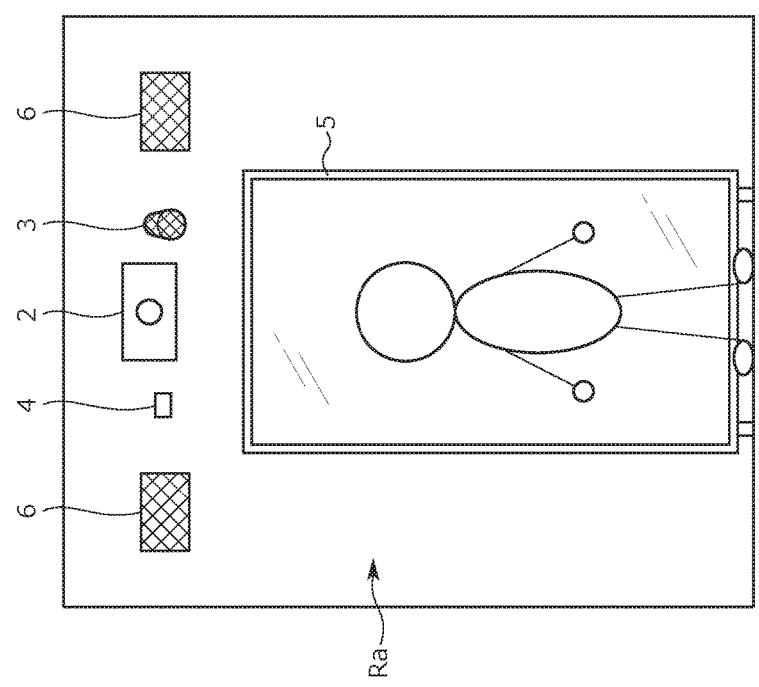

More specifically, any of the camera 2, the microphone 3, the display 5, and the speakers 6 is placed in a predetermined space (specifically, a room Ra at the home of the person A) at the home of the person A, as illustrated in FIGS. 2(A) and 2(B). FIGS. 2(A) and 2(B) are views of arrangement of components of the communication unit 1A in the room Ra where the person A is present while having conversation. FIG. 2(A) illustrates a front view, and FIG. 2(B) illustrates a plan view. When the person A is present in the room Ra, the person A can have conversation (remote conversation) via the present system S. That is, while the person A is present in the room Ra, the camera 2 acquires the video image of the person A, and the microphone 3 collects the voice of the person A. At the same time, the video image of the person B is displayed on a display screen of the display 5, and reproduced sound of the voice of the person B is emitted from the speakers 6.

The camera 2 is a well-known camera (specifically, a network camera) configured to acquire the video image of the person A in the room Ra to output such a video image signal to the home server 10. Note that in the present system S, the camera 2 is placed right above the display 5 as illustrated in FIG. 2(A). In the state in which the person A stands at a front position of the display 5, the camera 2 can acquire an entire body image of the person A.

The microphone 3 is a well-known microphone (specifically, a network microphone) configured to collect the voice emitted from the person A in the room Ra to output such a voice signal to the home server 10. Note that in the present system S, the microphone 3 is placed right above the display 5 as illustrated in FIG. 2(A). The microphone 3 collects the voice while the person A stands at the front position of the display 5 to talk to the video image (i.e., the video image of the person B) displayed on the display screen of the display 5.

The video image signal output from the camera 2 and the voice signal output from the microphone 3 are received by the home server 10, and then, are converted into digital data. Then, data coupling is further performed to form a single piece of video data. Such video data is transmitted from the home server 10 of the person A to the home server 10 of the person B.

Meanwhile, when receiving video data transmitted from the home server 10 of the person B, the home server 10 of the person A expands the video data. Thus, the video image and the voice indicated by the video data, i.e., the video image and the voice of the person B, are reproduced. That is, the home server 10 expands the video data transmitted from the home server 10 of the person B, and controls the display 5 and the speakers 6 based on the video data. As a result, the video image of the person B, more precisely the video image acquired by the camera 2 of the person B, is displayed on the display screen of the display 5. At the same time, the voice of the person B, more precisely the reproduced sound of the voice collected by the microphone 3 of the person B, is emitted from the speakers 6.

Note that the camera 2, the microphone 3, the display 5, and the speakers 6 of the person B form the communication unit 1B provided at the home of the person B, and any of these components is placed in a predetermined space (specifically, a room at the home of the person B) at the home of the person B.

Figure 3B:
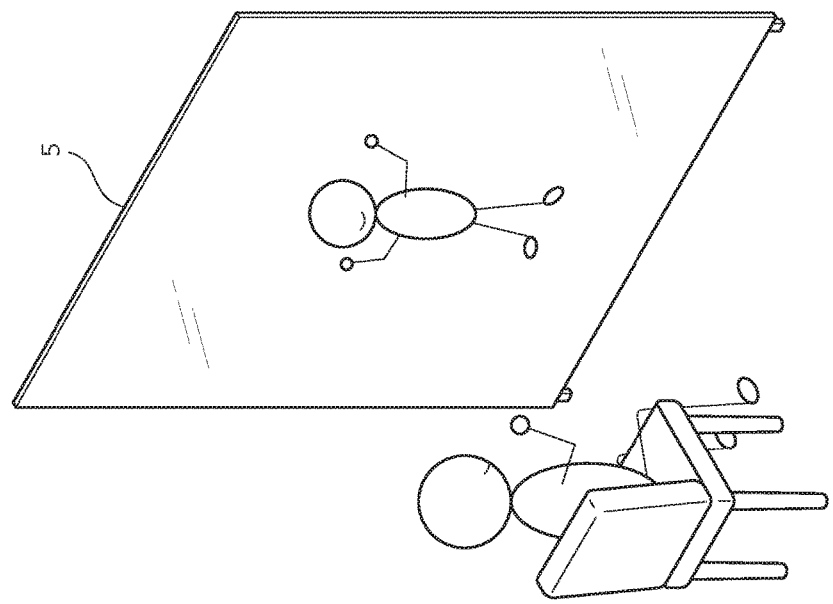
FIGS. 3(A) and 3(B) are views of an example of a display of the present invention.
Figure 3A:
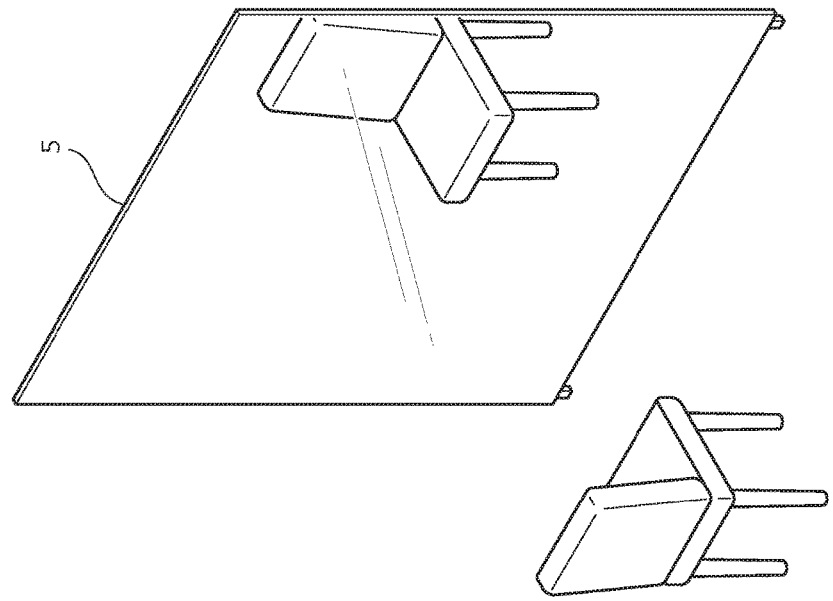

In the present system S, the display 5 functions as a decoration, specifically a full-length mirror, disposed in the room Ra in a normal state, and serves as the display screen only when conversation is held. The configuration of the display 5 will be described below in more detail with reference to FIGS. 3(A) and 3(B). FIGS. 3(A) and 3(B) are views of a configuration example of the display 5. FIG. 3(A) illustrates the normal state (a non-communication state), and FIG. 3(B) illustrates a state when conversation is held.

The display 5 forms a portion of the full-length mirror, specifically a mirrored portion, disposed in the room Ra at the home of the person A. For a period (the normal state) for which conversation is not held, the display 5 does not serve as the display screen, but shows an outer appearance as the mirrored portion as illustrated in FIG. 3(A). On the other hand, while the person A is having conversation with the person B, the display 5 serves as the display screen as illustrated in FIG. 3(B).

More specifically, a distance sensor 4 as an example of a sensor is provided in the room Ra. The distance sensor 4 is an optical distance sensor or an ultrasonic distance sensor, and is placed right above the display 5 as illustrated in FIG. 2(A). The distance sensor 4 is configured to detect a person in a detection area of the distance sensor 4 and measure a distance between the person and a reference position to output a signal corresponding to the distance to the home server 10. The reference position will be described herein. In the present system S, the position of a front surface (a surface forming the display screen) of the display 5 is set as the reference position. Thus, when the person A is in the detection area of the distance sensor 4 in the room Ra, the distance sensor 4 measures the distance between the person A and the display 5, specifically a distance d illustrated in FIG. 2(B). Note that the reference position is not limited to the placement position of the display 5, and may be other positions (e.g., the placement position of the camera 2) as long as the reference position is set within the room Ra.

Meanwhile, the home server 10 obtains the distance d between the person A and the display 5 based on the output signal of the distance sensor 4. When the obtained distance d is equal to or shorter than a predetermined distance, the home server 10 outputs a display screen forming instruction to the display 5. When receiving such an instruction, the display 5 serves as the display screen at the portion which has formed a mirrored surface. Then, the video image of the person B is displayed on the formed display screen.

As described above, the display screen for video image display is formed by the display 5 which also serves as the full-length mirror in the present system S, and formation/erasure of the display screen is freely switchable. The display 5 does not serve as the display screen, but functions as the full-length mirror as long as the distance d to the display 5 does not reach equal to or shorter than the predetermined distance. This allows the presence of the display screen to be less noticeable in the normal state (the non-communication state), and allows the display 5 to be effectively utilized as an interior accessory. Note that a well-known configuration as described in, e.g., International Patent Publication No. 2009/122716 can be utilized as the configuration of the full-length mirror which also serves as the display.

Note that the display 5 is not limited to the full-length mirror which also serves as the display, and any displays can be utilized without limitations as long as the display forms a portion of a building material, furniture, or a decoration disposed in the room Ra and formation/erasure of the display screen is freely switchable. For example, a portion of a building material forming a door or an inner wall of a building or a portion of furniture such as a closet may be used as the above-described display. Note that the display 5 is not limited to the display which also serves as the building material, the furniture, or the decoration, and normal display equipment may be used as the display 5.

Next, the configuration of the home server 10 will be described in detail. The home server 10 is a computer forming a so-called "home gateway." The home server 10 includes a CPU, a memory such as a ROM or a RAM, a hard disk drive, a communication interface, and an I/O port. Moreover, various programs are stored in the memory.

The functions of the home server 10 will be described. The home server 10 has the function of communicating with another home server 10, the function of generating video data based on the signals output from the camera 2 and the microphone 3, and the function of expanding received video data to reproduce a video image and voice. In addition to the above-described functions, communication processing performed for transmission/receiving of video data, i.e., the function of automatically determining termination of the conversation communication, is added to the present system S. Note that each function is provided in such a manner that the program stored in the memory of the home server 10 is read and executed by the CPU. A well-known technique can be utilized as a specific technique (the method) for implementing each function.

Figure 4:
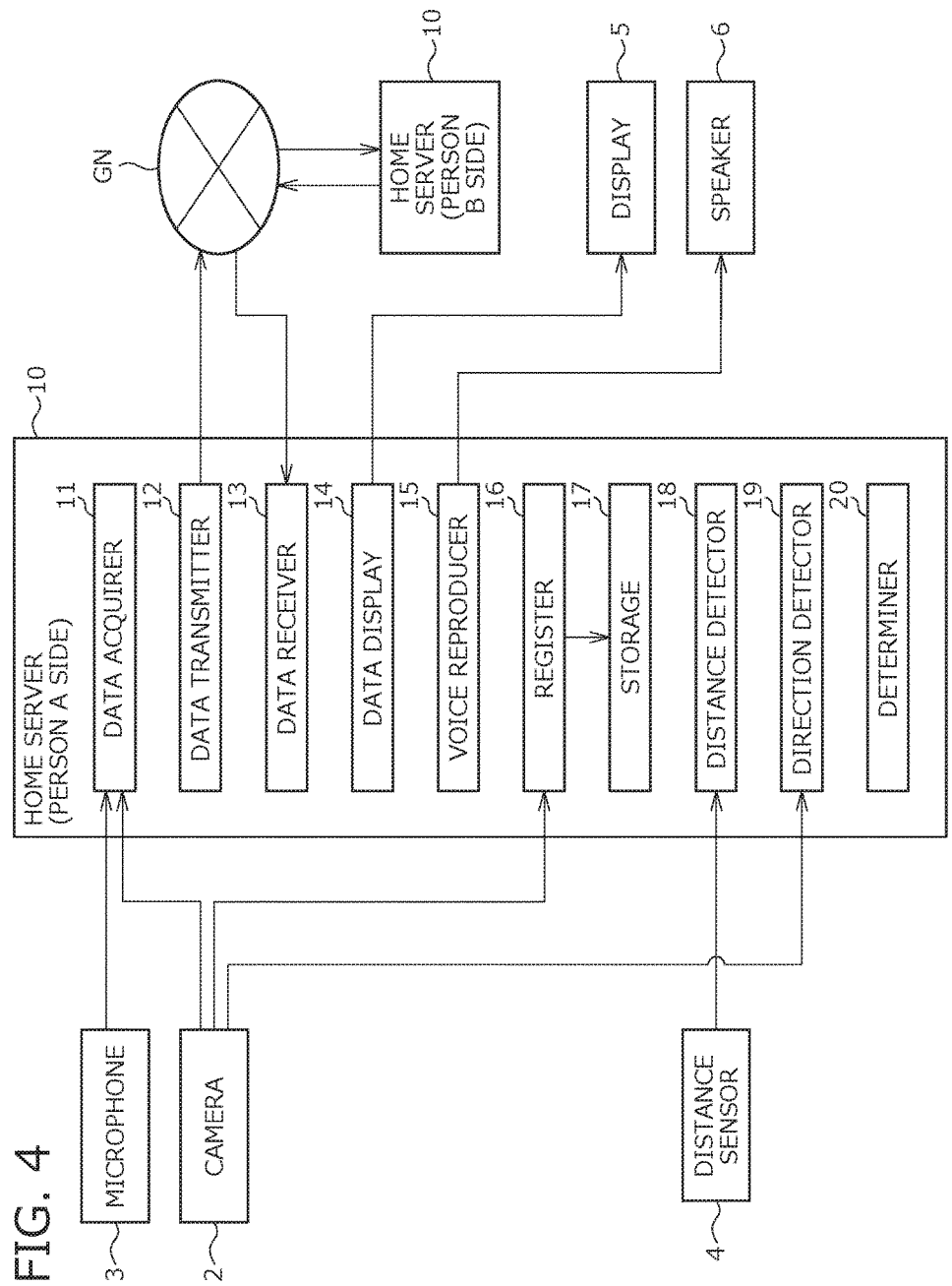
FIG. 4 is a diagram of a configuration of a home sever in terms of functions.

Hereinafter, the configuration of the home server 10 will be described again with reference to FIG. 4 in terms of functions. FIG. 4 is a block diagram of the configuration of the home server 10 in terms of functions. The home server 10 includes data processors illustrated in FIG. 4, i.e., a data acquirer 11, a data transmitter 12, a data receiver 13, a video image display 14, a voice reproducer 15, a register 16, a storage 17, a distance detector 18, a direction detector 19, and a determiner 20. Each data processor will be separately described below.

(Data Acquirer 11)

The data acquirer 11 is configured to receive and digitalize the signals output from the camera 2 and the microphone 3, i.e., a video image signal and a voice signal, via the I/O port and encode these signals to acquire video image data and voice data. In the present system S, the camera 2 and the microphone 3 is constantly formed during operation of the present system S, and accordingly, the data acquirer 11 constantly acquires the video image data and the voice data during operation of the present system S. Note that the present invention is not limited to such a configuration. For example, when the person A enters the room Ra, a not-shown human sensor may detect the person A, and the camera 2, the microphone 3, and the data acquirer 11 may operate in association with such room entry detection.

(Data Transmitter 12)

The data transmitter 12 is configured to couple (specifically, multiplex) the video image data and the voice data acquired by the data acquirer 11 to generate a single piece of video data and transmit the video data to the home server 10 of the person B as needed.

(Data Receiver 13)

The data receiver 13 is configured to receive, via the external communication network GN, the video data transmitted from the home server 10 of the person B. Note that the received video data is saved in a predetermined area of the memory or the hard disk drive of the home server 10 of the person A.

(Video Image Display 14)

The video image display 14 is configured to read, from the saving area, the video data received by the data receiver 13 to extract the video image data from the video data. Then, after decoding and expanding the extracted video image data, the video image display 14 outputs a display instruction to the display 5. When receiving such a display instruction, the display 5 displays, on the display screen thereof, an entire body image of the person B and a video image of a surrounding space.

In the present system S, the display 5 is the display which also serves as the full-length mirror. In order to display the video image of the person B, the video image display 14 outputs a display screen forming instruction to the display 5 showing the outer appearance as the full-length mirror. Output of the display screen forming instruction is executed with satisfaction of a predetermined condition as a trigger in the state in which the display 5 does not serve as the display screen. The "screen formation condition" described herein is that the distance calculated by the later-described distance detector 18 based on the signal output from the distance sensor 4, specifically the distance d between the communicator standing at the front position of the display 5 and the display 5, reaches equal to or shorter than the predetermined distance.

(Voice Reproducer 15)

The voice reproducer 15 is configured to read, from the saving area, the video data received by the data receiver 13 to extract the voice data from the video data. After decoding and expanding the extracted voice data, the voice reproducer 15 outputs a reproduction instruction to the speakers 6. When receiving such a reproduction instruction, the speakers 6 emit the reproduced sound of the voice of the person B.

(Register 16)

The register 16 is configured to register the communicator for initiation of the conversation communication, and is implemented in such a manner that the CPU of the home server 10 executes a communicator registration program stored in the memory. In registration by the register 16, a facial image of the communicator is registered. Specifically, when a person in the room Ra satisfies predetermined registration conditions, the register 16 acquires, from the camera 2, a video image signal indicating a video image at this point, and recognizes, from such a video image signal, a facial image of the person satisfying the above-described registration conditions. Then, the register 16 registers the recognized facial image as the facial image of the communicator.

Note that the processing of registration by the register 16 is executed every time the conversation communication is performed. More specifically, in a case where the person A enters the room Ra to have conversation with the person B, the processing of registering the person A as the communicator is executed. On the other hand, when other person (e.g., a family of the person A) than the person A enters the room Ra to have conversation with the person B, the processing of registering such a person as the communicators is executed. When the conversation communication ends, the registered facial image is deleted. When the conversation communication is newly performed, a person satisfying the registration conditions at this point is registered as the communicator.

Since the registration processing is executed every time the conversation communication is performed as described above, a case where the person, i.e., the communicator, entering the room Ra to have conversation with the person B varies can be properly handled. In particular, the communicator is registered for determination of automatic termination of the conversation communication as described later. Thus, the communicator can be grasped, and it can be properly determined whether or not the conversation communication is to be automatically terminated according to action of the communicator. Note that the specific flow and the registration conditions in the registration processing will be described later in detail.

(Storage 17)

The storage 17 is configured to store the facial image of the communicator registered by the register 16, and is the memory or the hard disk drive of the home server 10. The facial image is, as described above, stored in the storage 17 every time the conversation communication is performed. Moreover, the facial image stored in the storage 17 is deleted every time the conversation communication ends.

(Distance Detector 18)

The distance detector 18 is configured to detect the distance d between the display 5 and the communicator (i.e., the person registered as the communicator) whose facial image has been stored in the storage 17, and is implemented in such a manner that the home server 10 cooperates with the above-described distance sensor 4. Specifically, the CPU of the home server 10 executes a distance detection program stored in the memory, and uses, as an input, a value indicated by the signal output from the distance sensor 4 to figure out the above-described distance d in data processing using the distance detection program. Note that an area in which the distance detector 18 can detect the distance d is the detection area of the distance sensor 4, and is set within a range of several meters in front of the display 5 in the present system S. Thus, when the communicator is positioned outside the detection area of the distance sensor 4 (e.g., after the communicator has left the room Ra), the distance detector 18 is impossible to detect the distance d.

(Direction Detector 19)

The direction detector 19 is configured to detect the direction of the face of the communicator (i.e., the person registered as the communicator) whose facial image has been stored in the storage 17, more precisely the displacement of the face from the state of facing the display screen of the display 5 from the front thereof. The direction detector 19 is implemented in such a manner that the home server 10 cooperates with the camera 2. Specifically, the CPU of the home server 10 executes a direction detection program stored in the memory. In data processing using the direction detection program, the facial image of the communicator is recognized from the video image signal output form the camera 2, and then, the direction of the face of the communicator is identified from the recognized facial image. Note that a well-known image analysis technique can be utilized as the method for identifying the direction of the face from the facial image.

Moreover, in the present system S, the direction detector 19 detects the direction of the face of the communicator, but a detection target is not limited to the direction of the face. The direction of the line of sight of the communicator may be detected.

(Determiner 20)

The determiner 20 is configured to determine, while the conversation communication is being executed, whether or not the conversation communication is to be continued according to the distance d detected by the distance detector 18 and the facial direction of the communicator detected by the direction detector 19. The determiner 20 is implemented in such a manner that the CPU of the home server 10 executes a determination program stored in the memory.

As long as the direction of the face detected by the direction detector 19 is a predetermined direction relative to the display 5 while the conversation communication is being executed, the determiner 20 determines that the conversation communication is to be continued. On the other hand, when the direction of the face detected by the direction detector 19 is a direction different from the predetermined direction, if the distance d detected by the distance detector 18 increases afterward, the determiner 20 determines that the conversation communication is to be terminated when predetermined communication termination conditions are satisfied. Note that the predetermined direction relative to the display 5 means a direction facing the display screen of the display 5 from the front thereof.

Then, the home server 10 (precisely, the data acquirer 11, the data transmitter 12, and the data receiver 13) automatically terminates the conversation communication when the determiner 20 determines that communication is to be terminated. As described above, in the present system S, when the determiner 20 determines that communication is to be terminated, the conversation communication continued up to this point is automatically terminated. In order for the determiner 20 to determine that communication is to be terminated, the communicator needs to satisfy the predetermined communication termination conditions. Thus, the conversation communication is terminated at proper timing. Such a point is a feature of the present system S, and is realized in a conversation initiation flow and a conversation termination flow described below.

<<Flow of Conversation Communication>>

Figure 5:
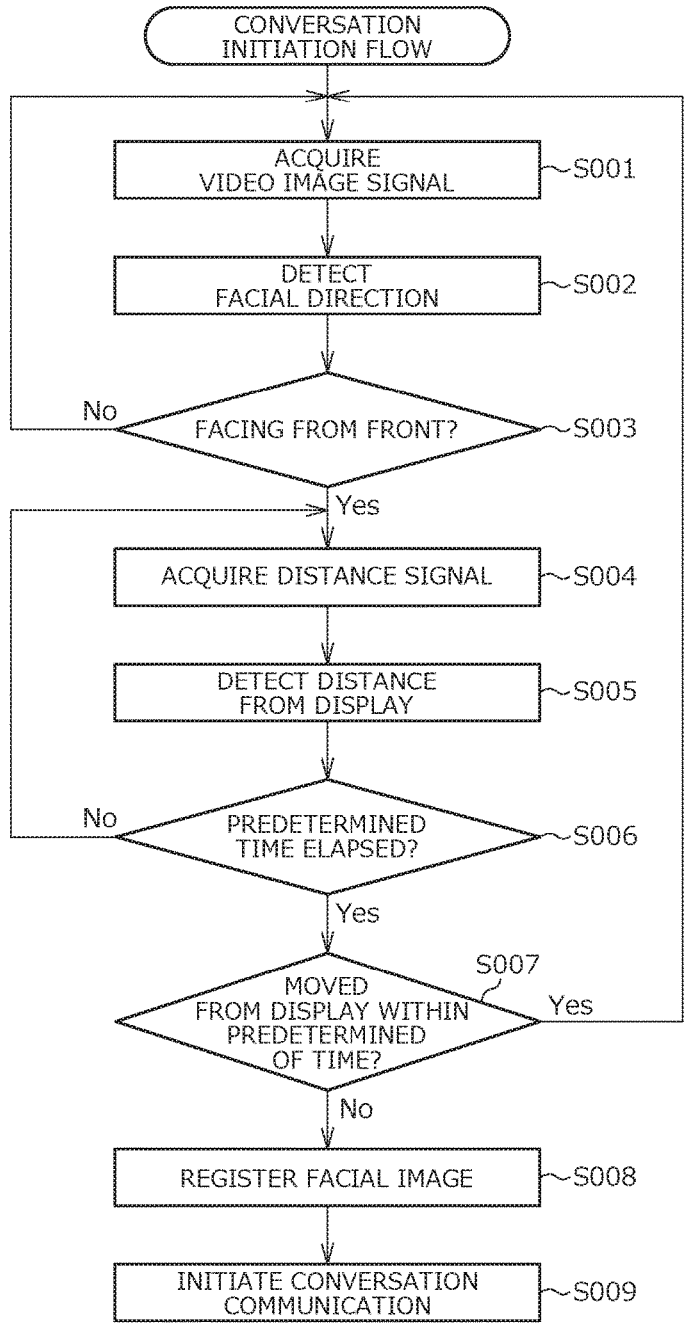
FIG. 5 is a chart of a conversation initiation flow.
Figure 6:
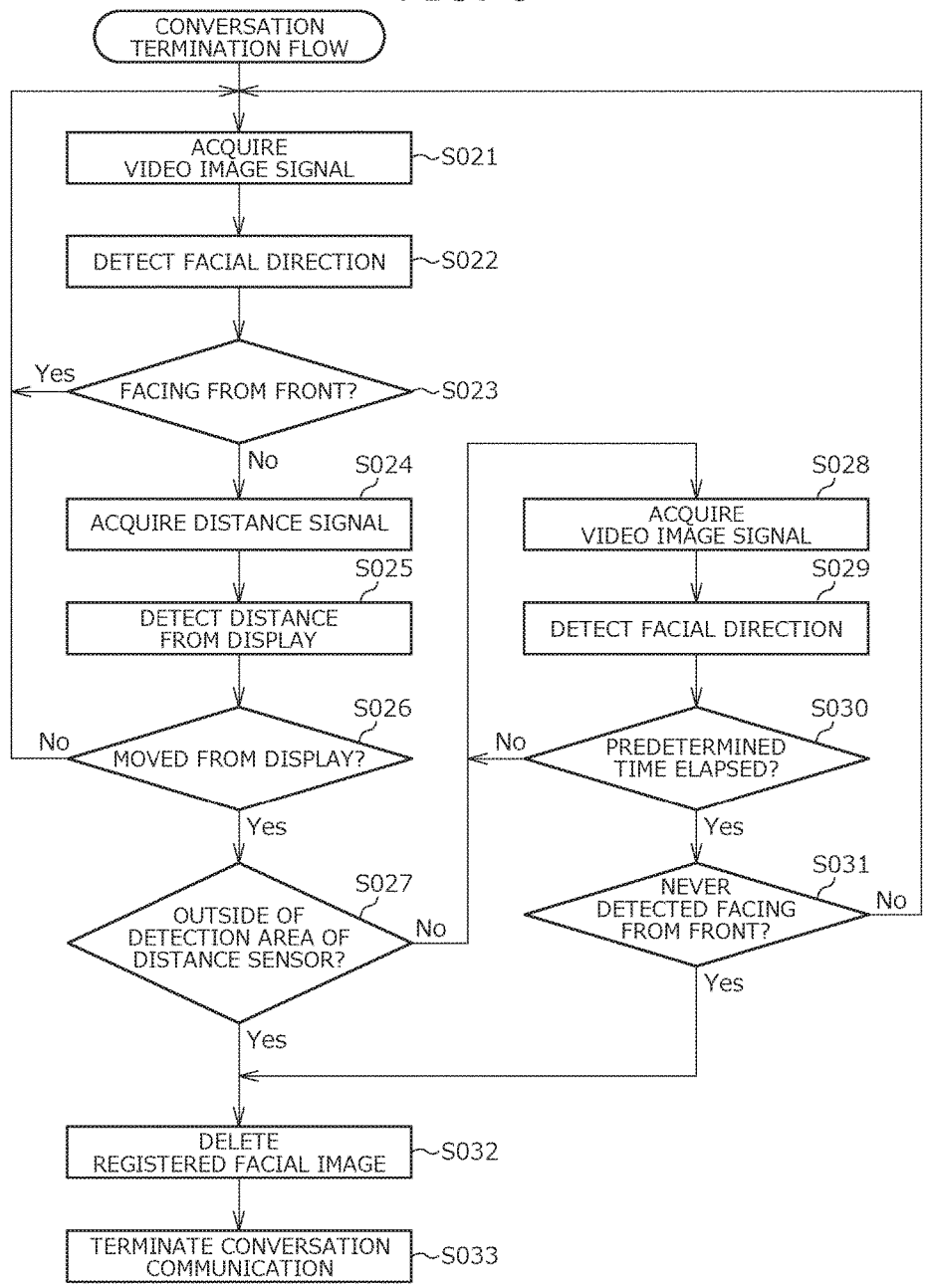
FIG. 6 is a chart of a conversation termination flow.

Next, the flow of communication between the communication units 1A, 1B in the present system S, i.e., the flow of the conversation communication, particularly an initiation flow (the conversation initiation flow) and a termination flow (the conversation termination flow), will be described with reference to FIGS. 5 and 6. FIG. 5 is a chart of the conversation initiation flow. FIG. 6 is a chart of the conversation termination flow.

In the conversation initiation flow and the conversation termination flow described below, a conversation communication method of the present invention is applied. That is, each step sequentially performed in each of the conversation initiation flow and the conversation termination flow is equivalent to a corresponding one of steps specifying the conversation communication method of the present invention. Each step of the conversation initiation flow and the conversation termination flow is performed by the home server 10 of each of the communication units 1A, 1B.

Note that in the conversation initiation flow, both of the home servers 10 of the persons A, B perform each step shown in FIG. 5. Thus, only the conversation initiation flow in the home server 10 of the person A will be described below. Moreover, in the conversation termination flow, any of the home servers 10 of the persons A, B performs each step shown in FIG. 6. Thus, a case where each step of the conversation termination flow is performed in the home server 10 of the person A will be described below as an example. Note that the contents described below are, needless to say, similarly applicable to the home server 10 of the person B.

(Conversation Initiation Flow)

The conversation initiation flow begins when the person A enters the room Ra and stands at the front position of the display 5 (i.e., when the person A enters the detection area of the distance sensor 4). The conversation initiation flow progresses according to procedure shown in FIG. 5. Specifically, in the conversation initiation flow, the video image of the person A standing at the front position of the display 5 is first acquired by the camera 2, and such a video image signal is acquired (received) by the home server 10 (S001). Subsequently, the home server 10 recognizes, using the above-described function of the direction detector 19, the video image of the person A from the video image signal acquired from the camera 2, and then, detects the direction of the face of the person A (S002). Then, the home server 10 determines whether or not the detected direction of the face is the direction facing the display screen of the display 5 from the front thereof (S003).

When the direction of the face is the direction facing the display screen of the display 5 from the front thereof, the home server 10 acquires (receives), from the distance sensor 4, a signal (hereinafter referred to as a "distance signal") corresponding to the distance d between the person A and the display 5 (S004). Then, the home server 10 detects, using the above-described function of the distance detector 18, the distanced based on the distance signal (S005). The home server 10 repeats, at regular intervals, the step S004 of acquiring the distance signal and the step S005 of detecting the distance d.

Then, after a predetermined period of time has elapsed from detection of the direction of the face of the person A facing the display screen of the display 5 from the front thereof (S006), the home server 10 determines whether or not the position of the person A moves apart from the display 5 within such a predetermined period of time (S007). In other words, during a period until the predetermined period of time is elapsed after the detected direction of the face of the person A has changed to the direction facing the display screen of the display 5 from the front thereof, the home server 10 determines whether or not the distance d detected at the step S005 increases. Note that in the present system S, even when the distance d increases, if such an increment is less than a defined amount (e.g., 10 cm), the distance d is considered as being not increased.

When the result of "not moving the position of the person A apart from the display 5" is obtained at the above-described determination step S007, the home server 10 registers, using the above-described function of the register 16, the person facing the display screen of the display 5 from the front thereof, i.e., the person A, as the communicator (S008). Specifically, a video image signal indicating a video image when the determination result of not moving the position of the person A apart from the display 5 is obtained is acquired from the camera 2, and the facial image of the person A is recognized from such a video image signal. Then, the recognized facial image is stored in the hard disk drive (the storage 17).

Of persons in the room Ra, the person satisfying the following two registration conditions (R1), (R2) is, as described above, registered as the communicator in the present system S:

(R1) the direction of the face detected by the home server 10 is the direction facing the display screen of the display 5 from the front thereof; and (R2) during the period until the predetermined period of time is elapsed after the direction of the face has changed to the direction facing the display screen of the display 5 from the front thereof, the distance d to the display 5 as detected by the home server 10 does not increase (the person A does not move apart from the display 5).

Then, the conversation communication between the communication units 1A, 1B begins with registration of the facial image as a trigger, and both units transmit/receive video data (S009). This allows the person A to hear the reproduced sound of the voice of the person B via the speakers 6 while viewing the image of the person B on the display screen of the display 5. Similarly, the person B hears the reproduced sound of the voice of the person A via the speakers 6 while viewing the image of the person A on the display screen of the display 5.

(Conversation Termination Flow)

The conversation termination flow begins during a conversation communication execution period, and progresses according to procedure shown in FIG. 6. More precisely, the conversation termination flow is divided into a first stage constantly repeated during the conversation communication execution period, a second stage executed when a predetermined condition is satisfied at the first stage, a third stage executed when a predetermined condition is satisfied at the second stage, and a fourth stage for actually terminating the conversation communication.

At the first stage, the direction of the face of the person A as the communicator is recognized. Specifically, the video image of the person A standing at the front position of the display 5 is acquired by the camera 2, and such a video image signal is acquired (received) by the home server 10 (S021). Subsequently, the home server 10 recognizes, using the above-described function of the direction detector 19, the video image of the person A from the video image signal acquired from the camera 2, and then, detects the direction of the face of the person A (S022). Then, the home server 10 determines whether or not the detected direction of the face is the direction facing the display screen of the display 5 from the front thereof (S023).

Then, when the direction of the face is not the direction facing the display screen of the display 5 from the front thereof, the process transitions to the second stage. At the second stage, the distance d between the person A and the display 5 is checked. Specifically, the home server 10 acquires (receives) a distance signal corresponding to the distance d from the distance sensor 4 (S024). Moreover, the home server 10 detects, using the above-described function of the distance detector 18, the distance d based on the distance signal (S025). Then, the home server 10 compares the detected distance d with a most recent one (e.g., the distance d detected at the step S005 of the conversation initiation flow) of previously-detected distances d to determine whether or not the position of the person A moves apart from the display 5 (S026). That is, the home server 10 determines whether or not the currently-detected distance d has increased beyond the previously-detected distance d. Note that in the present system S, even when the distance d increases, if such an increment is less than a predetermined amount (e.g., 10 cm), the distance d is considered as being not increased.

Then, when the result of moving the position of the person A apart from the display 5 is obtained at the above-described determination step S026, i.e., when the currently-detected distance d has increased beyond the previously-detected distance d, the process transitions to the third stage. The case where the currently-detected distance d has increased beyond the previously-detected distance d as described herein includes a case where the distance d become undetectable due to an extreme increase in the distance d, i.e., a case where the position of the person A moves to the outside of the detection area of the distance sensor 4. On the other hand, when the determination result of not moving the position of the person A apart from the display 5 is obtained at the above-described determination step S026, the process returns to the first stage.

At the third stage, the home server 10 determines, using the above-described function of the determiner 20, whether or not the conversation communication termination conditions are satisfied. Specifically, based on the distance d detected at the step S025, it is determined whether or not the position of the person A is outside the detection area of the distance sensor 4 (S027). That is, the home server 10 determines whether or not the person A is at such a position that the distance d is undetectable by the distance detector 18. Then, when it is determined that the position of the person A is outside the detection area of the distance sensor 4, the home server 10 determines that communication is to be terminated, and the process transitions to the fourth stage.

On the other hand, when it is determined that the position of the person A is not outside the detection area of the distance sensor 4, the home server 10 subsequently acquires a video image signal from the camera 2 to recognize the video image of the person A from the video image signal (S028). Moreover, the home server 10 detects the direction of the face of the person A from the recognized video image thereof (S029). Then, the home server 10 repeats, during a predetermined period of time, the step S028 of acquiring the video image signal and the step S029 of detecting the direction of the face of the person A (S030). The "predetermined period of time" described herein is a period until a time for communication termination determination is elapsed after the determination result showing that the direction of the face of the person A is different from the direction facing the display screen of the display 5 from the front thereof has been obtained at the step S023 of the first stage. Moreover, the "time for communication termination determination" is a preset time for determination of communication termination, and is set to 60 seconds, for example.

After a lapse of the predetermined period of time, the home server 10 determines whether or not the direction of the face of the person A has never faced the display screen of the display 5 from the front thereof within the predetermined period of time, i.e., whether or not the direction of the face of the person A is, for the predetermined period of time, maintained at the direction different from the direction facing the display screen of the display 5 from the front thereof (S031). Then, when it is determined that the direction of the face of the person A has never faced the display screen of the display 5 from the front thereof within the predetermined period of time, the home server 10 determines that communication is to be terminated, and the process transitions to the fourth stage.

At the fourth stage, the home server 10 (the home server 10 of the person A) stops data transmission/receiving with respect to the home server 10 (the home server 10 of the person B) as the communication partner, thereby terminating the conversation communication (S033). Note that in the present system S, the facial image of the communicator, i.e., the facial image of the person A, stored in the hard disk drive is deleted prior to termination of the conversation communication (S032). Note that the timing for deleting the facial image is not limited to timing right before termination of the conversation communication, and may be timing after termination of the conversation communication.

As described above, in the present system S, the conversation communication is automatically terminated when all of the following three termination conditions (S1) to (S3) are satisfied during execution of the conversation communication:

(S1) the direction of the face of the communication is different from the direction facing the display screen of the display 5 from the front thereof;

(S2) the distance d between the communicator and the display 5 increases (the communicator moves apart from the display 5); and (S3) any of the following two requirements (S3-1), (S3-2) is satisfied:

(S3-1) the communicator is outside the detection area of the distance sensor 4; and (S3-2) the direction of the face of the communicator is, for equal to or longer than the predetermined period of time, maintained at the direction different from the direction facing the display screen of the display 5 from the front thereof.

According to the configuration of the present system S as described above, the conversation communication can be properly terminated at such a point that the conversation communication needs to be terminated. Specifically, in the present system S, the direction of the face of the communicator and the distance d between the communicator and the display 5 (i.e., the position of the communicator relative to the display 5) are used as parameters for communication termination determination. Thus, a failure caused when communication termination is determined based only on any one of these parameters can be avoided.

Figure 7:
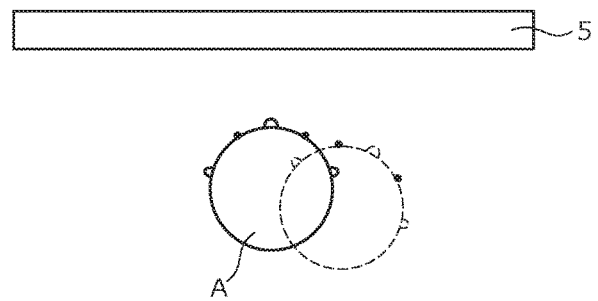
FIG. 7 is a view of a state in which the direction of the face of the communicator changes.

For the sake of simpler description, a case where only the condition where the direction of the face of the communicator is different from the direction facing the display screen of the display 5 from the front thereof is employed as the communication termination condition is assumed. In such a case, when the communicator (the person A in the figure) changes the direction of the face for only a moment without changing a standing position as illustrated in FIG. 7, even if the communicator subsequently attempts to continuously have conversation, the conversation communication is interrupted. FIG. 7 is a view of a state when the person A as the communicator changes only the direction of the face and the person A is viewed from the above.

Figure 8:
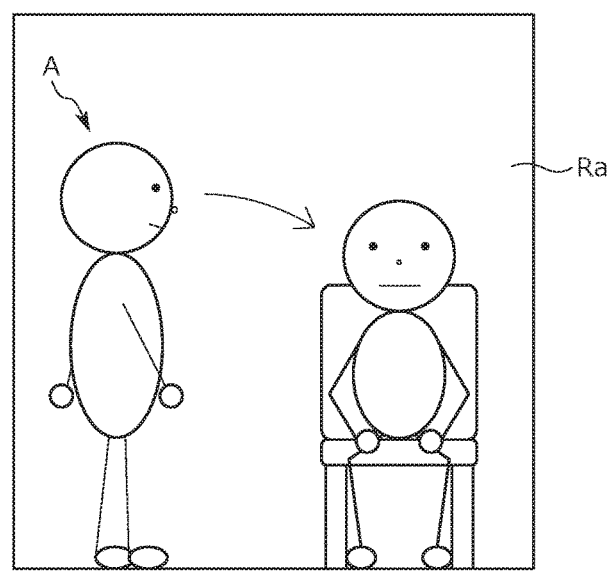
FIG. 8 is a view of a state in which the position of the communicator moves.

Moreover, a case where only a change in the position of the communicator relative to the display 5 is employed as the communication termination condition is assumed as another case. In such a case, when the communicator (the person A in the figure) slightly moves as illustrated in FIG. 8, even if the communicator subsequently attempts to continuously have conversation, the conversation communication is interrupted. FIG. 8 is a view of a state when the position of the person A as the communicator moves, and illustrates a video image acquired by the camera 2.

In the present system S, the conversation communication continues as long as all of the three termination conditions (S1) to (S3) are not satisfied as described above. Thus, the above-described failure leading to termination of the conversation communication against the communicator's intention can be avoided.

Moreover, in the present system S, the facial image of the communicator is registered upon initiation of the conversation communication, and the conversation communication can be reliably terminated in such a manner that the communicator whose facial image has been registered takes action corresponding to the above-described three termination conditions (S1) to (S3).

Figure 9:
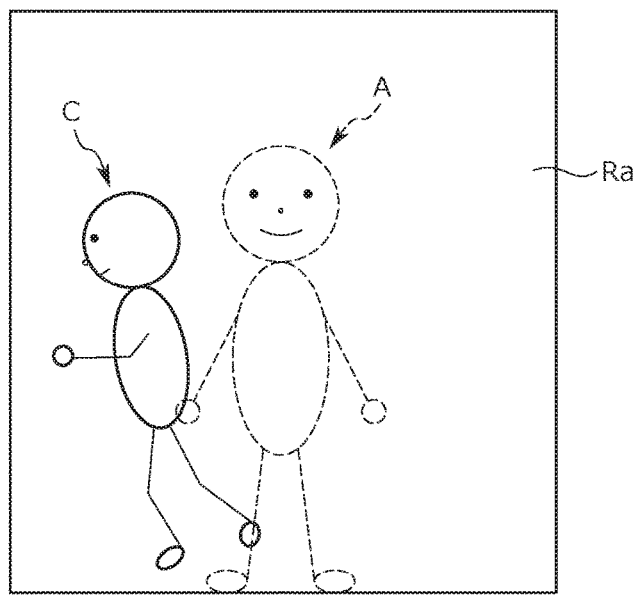
FIG. 9 is a view of a situation where other person than the communicator is present after the communicator has left a room.

For the sake of simpler description, the following case will be described as an example: the human sensor is provided in the room Ra and a condition where the human sensor no longer detect a person in the room Ra is taken as the communication termination condition. In such a case, even when the communicator (the person A in the figure) ends conversation and leaves the room Ra, if there is a person (a person C in the figure) in the room Ra at this point, the human sensor detects the person C, as illustrated in FIG. 9. In this case, the conversation communication is erroneously continued even though conversation has ended. Note that FIG. 9 is a view of a situation where the person C other than the communicator remains in the room after the person A as the communicator has left the room, and illustrates a video image acquired by the camera 2.

Figure 10:
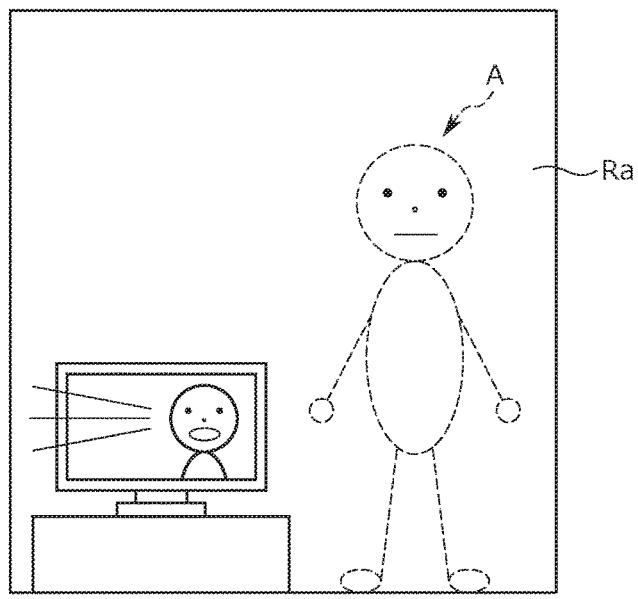
FIG. 10 is a view of a situation where noise is caused after the communicator has left the room.

Further, the following case will be described as another example case: a voice detection sensor is provided in the room Ra and a condition where the voice detection sensor no longer detects voice in the room Ra is taken as the communication termination condition. In such a case, even when the communicator (the person A in the figure) ends conversation and leaves the room Ra, if there is noise (e.g., television sound) in the room Ra at this point, the voice detection sensor detects such noise, as illustrated in FIG. 10. In this case, the conversation communication is erroneously continued even though conversation has ended. Note that FIG. 10 is a view of a situation where noise is caused after the person A as the communicator has left the room, and illustrates a video image acquired by the camera 2.

On the other hand, in the present system S, communication termination is determined based on action of the communicator whose facial image has been stored. Thus, the following situation can be avoided: e.g., the person still remaining in the room Ra and the noise caused in the room Ra are recognized upon termination of conversation and as a result, the conversation communication is erroneously continued. Particularly in the present system S, the above-described three conditions (S1) to (S3) are set as the conversation communication termination conditions. Thus, in light of efficient determination of satisfaction of each termination condition, action targeted for such determination is preferably limited to action of the person registered as the communicator.

Further, in the present system S, the condition where the communicator moves to the outside of the detection area of the distance sensor 4 is taken as one of the communication termination conditions. The action of moving to the outside of the detection area of the distance sensor 4 is made when conversation ends and the communicator leaves the room Ra, for example. Such action reflects the communicator's intention to terminate conversation. Thus, when the condition where the communicator moves to the outside of the detection area of the distance sensor 4 is employed as the communication termination condition, the conversation communication can be terminated at such timing that it is reasonable to terminate the conversation communication according to the communicator's intention.

Moreover, of the persons in the room Ra, the person whose facial direction is the direction facing the display screen of the display 5 from the front thereof and whose distance to the display 5 does not change for a certain period of time is registered as the communicator in registration of the communicator. Satisfaction of such a registration condition reflects that the person (a registration target) to be registered has the intention of having conversation. In other words, in the present system S, action made according to the communicator's intention is taken as the registration condition. This prevents erroneous registration of the person not having the intention of having conversation, and only the person who truly needs to be registered as the communicator can be registered.

<<Other Embodiments>>

In the above-described embodiment, the conversation communication system and method of the present invention have been described as an example. Note that the above-described embodiment has been set forth merely as an example for the sake of easy understanding of the present invention, and is not intended to limit the present invention. That is, changes and modifications can be made to the present invention without departing from the gist of the present invention, and needless to say, the present invention includes equivalents thereof.

Moreover, in the above-described embodiment, when the home server 10 detects the direction of the face or the line of sight of the communicator, the direction relative to the display 5 is detected, and more specifically, it is detected whether or not the face or the line of sight of the communicator is in the direction facing the display screen of the display 5 from the front thereof. Note that equipment as a reference in detection of the face or the line of sight is not limited to the display 5, and other types of equipment (e.g., the camera 2 or the microphone 3) may be employed.

Further, in the above-described embodiment, the data acquirer 11, the data transmitter 12, the data receiver 13, the video image display 14, the voice reproducer 15, the register 16, the storage 17, the distance detector 18, the direction detector 19, and the determiner 20 are all included in the home server 10. Note that the present invention is not limited to such a configuration. At least one of the above-described data processors may be included in a device different from the home server 10.

In addition, in the above-described embodiment, one of the persons in the space when conversation is held is registered as the communicator, the one of the persons satisfying the above-described two registration conditions (R1), (R2). Note that other conditions than the above-described two conditions (R1), (R2) may be further added to the registration conditions.

Moreover, in the above-described embodiment, registration of the communicator is performed every time the conversation communication is performed, but the present invention is not limited to such a configuration. For example, the communicator (precisely, the facial image of the communicator) may be registered in advance. In such a configuration, the facial image of the person standing at the front position of the display 5 is recognized upon initiation of the conversation communication, and the recognized facial image is checked against the pre-registered facial image of the communicator. Then, the conversation communication may begin under the condition of matching between both facial images.

Further, in the above-described embodiment, the conversation communication is automatically terminated when the above-described three termination conditions (S1) to (S3) are all satisfied during execution of the conversation communication. Note that other conditions than the above-described three conditions (S1) to (S3) may be further added to the termination conditions.

REFERENCE SIGNS LIST 1A, 1B: communication unit
2: camera
3: sound collection device 4: distance sensor
5: display
6: speaker
10: home server
11: data acquirer
12: data transmitter
13: data receiver
14: video image display
15: voice reproducer
16: register
17: storage
18: distance detector
19: direction detector
20: determiner
GN: external communication network
Ra: room
S: present system

The invention claimed is:

1. A conversation communication system for implementing conversation between communicators, respectively, in a plurality of spaces which are distant from each other, using communication units provided respectively in the plurality of spaces to communicate with each other,
wherein each of the communication units includes:
a register configured to register a communicator in one of the plurality of spaces;
a storage configured to store a facial image of the communicator registered by the register;
a distance detector configured to detect a distance between the communicator whose facial image has been stored in the storage and a reference position set in the one of the plurality of spaces;
a direction detector configured to detect a facial or sight line direction of the communicator whose facial image has been stored in the storage; and
a determiner configured to determine, according to the distance detected by the distance detector and the facial or sight line direction detected by the direction detector, whether or not communication between the communication units is to be continued,
wherein, while the facial or sight line direction detected by the direction detector is a predetermined direction relative to an equipment placed at the reference position, the determiner determines that the communication between the communication units is to be continued, and
wherein when the distance detected by the distance detector increases after the facial or sight line direction detected by the direction detector has changed to a direction different from the predetermined direction relative to the equipment, if any of conditions (1) and (2) is satisfied, the determiner determines that the communication between the communication units is to be terminated,
the condition (1) being that the communicator whose facial image has been stored in the storage is at such a position that the distance is undetectable by the distance detector and
the condition (2) being that the facial or sight line direction detected by the direction detector is, for time equal to or longer than a preset period of time, maintained at the direction different from the predetermined direction relative to the equipment
wherein the register registers a person as the communicator when the person is in the one of the plurality of spaces and the person's facial or sight line direction detected by the direction detector is the predetermined direction relative to the equipment, and
wherein every time the communication between the communication units ends, the facial image of the communicator registered by the register is deleted from the storage.

2. The conversation communication system according to claim 1, wherein the register registers a person satisfying a condition (3) as the communicator when the person is in the one of the plurality of spaces and the person's facial or sight line direction detected by the direction detector is the predetermined direction relative to the equipment, the condition (3) being that the distance to the reference position as detected by the distance detector does not increase during a period until a predetermined period of time is elapsed after the facial or sight line direction detected by the direction detector has changed to the predetermined direction relative to the equipment.

3. The conversation communication system according to claim 1,
wherein the each of the communication units includes, as the equipment, a display forming a display screen configured to display a video image of the communicator of another space of the plurality of spaces,
wherein the reference position is a placement position of the display in the one of the plurality of spaces, and
wherein the predetermined direction is a direction in which the person faces the display screen from a front thereof.

4. The conversation communication system according to claim 1,
wherein the distance detector includes a sensor placed in the one of the plurality of spaces and configured to output a signal corresponding to the distance when the communicator is in the one of the plurality of spaces, and
wherein the position at which the distance is undetectable by the distance detector is outside an area where the communicator is detectable by the sensor.

5. A conversation communication method for implementing conversation between communicators, respectively, in a plurality of spaces which are distant from each other, using communication units provided respectively in the plurality of spaces to communicate with each other, the method comprising:
registering, by a register included in each of the communication units, a communicator in a corresponding one of the plurality of spaces;
storing, by a storage included in the each of the communication units, a facial image of the communicator registered by the register;
detecting, by a distance detector included in the each of the communication units, a distance between the communicator whose facial image has been stored in the storage and a reference position set in the corresponding one of the plurality of spaces;
detecting, by a direction detector included in the each of the communication units, a facial or sight line direction of the communicator whose facial image has been stored in the storage; and
determining, by a determiner included in the each of the communication units, whether or not communication between the communication units is to be continued according to the distance detected by the distance detector and the facial or sight line direction detected by the direction detector, wherein while the facial or sight line direction detected by the direction detector is a predetermined direction relative to an equipment placed at the reference position, the determiner determines that the communication between the communication units is to be continued, and wherein when the distance detected by the distance detector increases after the facial or sight line direction detected by the direction detector has changed to a direction different from the predetermined direction relative to the equipment, if any of conditions (1) and (2) is satisfied, the determiner determines that the communication between the communication units is to be terminated, the condition (1) being that the communicator whose facial image has been stored in the storage is at such a position that the distance is undetectable by the distance detector and the condition (2) being that the facial or sight line direction detected by the direction detector is, time for equal to or longer than a preset period of time, maintained at the direction different from the predetermined direction relative to the equipment, wherein the register registers a person as the communicator when the person is in the one of the plurality of spaces and the person's facial or sight line direction detected by the direction detector is the predetermined direction relative to the equipment, and wherein every time the communication between the communication units ends, the facial image of the communicator registered by the register is deleted from the storage.

* * * * *